United States Patent [19]

Hart-Smith et al.

[11] Patent Number: 4,579,475

[45] Date of Patent: Apr. 1, 1986

[54] OPTIMIZED BOLTED JOINT

[75] Inventors: Leonard J. Hart-Smith, Long Beach; Bruce L. Bunin, Huntington Beach; Donald J. Watts, Fountain Valley, all of Calif.

[73] Assignee: The United States of America as represented by the Administrator of the National Aeronautics and Space Administration, Washington, D.C.

[21] Appl. No.: 573,162

[22] Filed: Jan. 23, 1984

[51] Int. Cl.$^4$ .............................. F16B 2/02; F16D 1/02
[52] U.S. Cl. .................................... 403/312; 403/388; 403/408.1
[58] Field of Search .................. 403/312, 408, 388

[56] References Cited

U.S. PATENT DOCUMENTS

| | | |
|---|---|---|
| 2,629,906 | 3/1953 | Holmes . |
| 2,920,498 | 1/1960 | Federn . |
| 3,521,917 | 7/1970 | King . |
| 3,828,515 | 8/1974 | Galgoczy et al. . |
| 3,830,581 | 8/1974 | Furlong ............... 403/388 X |
| 4,120,998 | 10/1978 | Olez . |
| 4,344,995 | 8/1982 | Hammer . |
| 4,390,153 | 6/1983 | Wuermseer . |

FOREIGN PATENT DOCUMENTS

| | | | |
|---|---|---|---|
| 641432 | 8/1950 | United Kingdom | 403/312 |
| 737546 | 6/1980 | U.S.S.R. | 403/312 |

Primary Examiner—Andrew V. Kundrat
Attorney, Agent, or Firm—Howard J. Osborn; Wallace J. Nelson; John R. Manning

[57] ABSTRACT

A joint for joining composite material such as segments of the skin 12 and 13 of an aircraft. Tapered splice plates 30 and 31 overlap the ends 14 and 15 of the skin. The thickest portion 34 of the splice plates overlap the ends 14 and 15. The splice plates are clamped together on the skin segments 12 and 13 by fasteners 50, 52, 54 and 56. The tapered splice plates are designed to minimize load transfer at the outermost bolt row 56 coincident with maximum bypass stress in the skin segments while simultaneously maximizing load transfer in both the skin segments and splice plates at the innermost bolt row 50.

19 Claims, 4 Drawing Figures

OPTIMIZED BOLTED JOINT

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

FIELD OF THE INVENTION

This invention relates to the field of bolted joints. More particularly, the invention is directed to providing an optimized bolted joint for composite structures. As a general rule, composite structures are brittle and subject to fracture when subjected to high strain. This invention is a method and apparatus for optimizing strain and load transfer in the making of a composite joint.

BACKGROUND ART

There are several prior art joint arrangements which may be utilized to join composite materials such as the skin of an aircraft. One such type joint is the scarf joint wherein the skin is highly tapered, and sandwiched between the splice plates which are also highly tapered. Although it would be expected that the scarf joint is one of the better joints, in actuality it has been shown to be the weakest joint, as well as the most difficult to manufacture and assemble. The scarf joint fails, basically because the thickness of the tapered skin is reduced below nominal before the first fastener station is reached in a multi-bolt fastener arrangement. This results in a failure of the skin in the thin section, and a premature failure of the joint.

Another common type of prior art joint used in joining composite materials is the standard uniformly thick skin structure, sandwiched between uniformly thick splice plates. Although this joint arrangement is superior to that of the scarf joint arrangement, it has a weakness in that the joint strength at certain of the critical bolt locations is limited by the bearing bypass envelope. This means that due to the uniform thickness of the skin and splice plates, a high load transfer coincident with a high bypass stress causes premature joint failure.

SUMMARY OF THE INVENTION

This invention relates to a joint for composite material wherein the material to be joined, such as aircraft skin sections, is sandwiched between tapered splice plates. The skin is of a constant thickness throughout the joint and the splice plates taper in thickness from the last to the first bolt rows in order to reduce the stiffness of the splice plate and thereby reduce the load transfer at the location where bypass loads are highest. The last row of bolts are in the thin end of the splice plate and the first row of bolts are in the thick portion of the splice plate. Joint load is maximized by minimizing the bearing area (i.e., bearing load taken into the splice plate), at the splice plate location where the splice plate is thinnest, while maximizing the bypass load in the skin net section at the same location. Simultaneously, the bearing load in both the skin and the splice plate is maximized in the area where the splice plate is thickest. The thickest portion of the splice plate must have enough net section strength to accommodate the higher load carried through the section. These principles apply to bolted joints using tapered splice plates with two or more bolt rows.

In accordance with this invention, it is, therefore, an object of the invention to provide a multi-row bolted joint which optimizes the load carrying capabilities of composite joints.

It is a further object of the invention to provide a joint for composite materials wherein the area of the splice plate is minimized where the load in the skin is greatest.

It is still another object of the invention to maximize the load transfer between the member to be joined and the splice plate at the thickest portion of the splice plate and the location where the ends of the structural members to be joined are positioned.

These and other objects and advantages of the invention will become more apparent when considered in conjunction with the accompanying drawings.

DESCRIPTION OF BEST MODE FOR CARRYING OUT THE INVENTION

Figure 1:
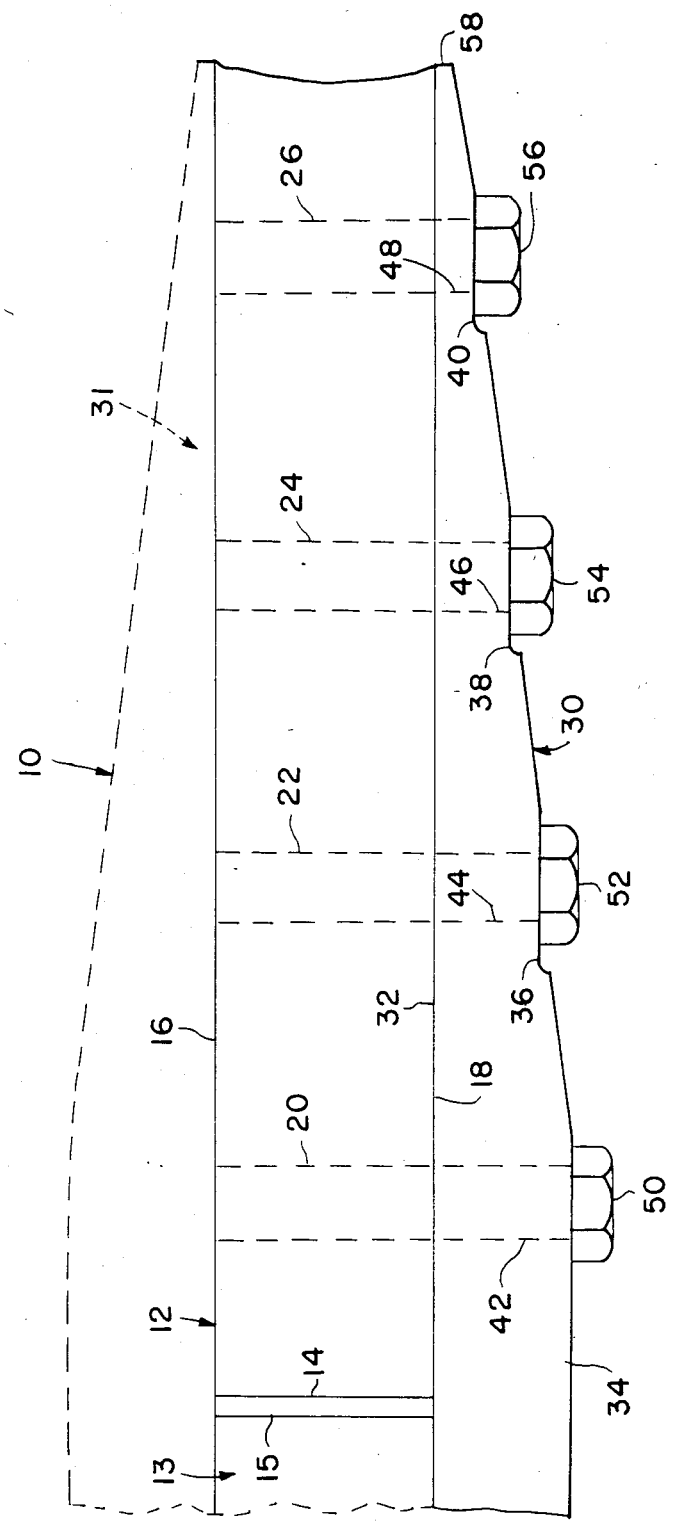
FIG. 1 is a cross-sectional view showing a section of a first and second structural member to be joined by tapered splice plates.

The invention is best illustrated in FIG. 1 which shows a multi-row bolted joint designated generally by the reference numeral 10. The joint consists of a main structural member 12 and an adjacent like structural member 13 which have ends 14 and 15, respectively, which are in abutting or closely spaced adjacency. The structural members 12 and 13 may take various forms and configurations; however, for purposes of discussion they will be considered as the skin of an aircraft. Although the invention has application to various types of materials, including metals, the invention has particular application to composites which are constructed from graphite-epoxy unidirectional tape or layers. A particular composite tested contained plys wherein the fiber patterns were 37.5% zero degree, 50% ±45 degrees, and 12.5% 90 degrees. The tapes or plys were constructed of TORAY high strength T300 fibers and CIBA-GEIGY 914 resin. The actual thickness of the skin was varied according to the particular application of the composite material to the structural element under consideration for the aircraft design.

Figure 2:
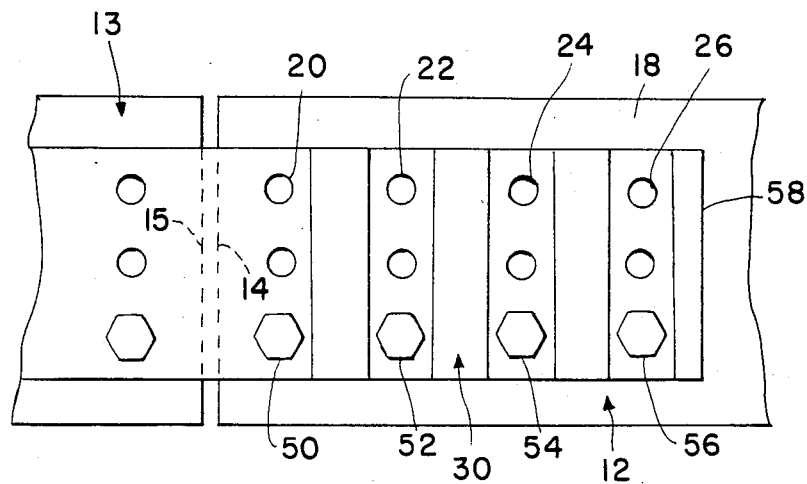
FIG. 2 is a plan view of the cross-section joint of FIG. 1.

The skin structures 12 and 13 are of a uniform thickness throughout the area of the splice joint. For purposes of illustration, the details of the skin 12 will be described; however, it is to be understood that the details of the skin 13 are similar. The skin 12 has a first side 16 and an opposite side 18. The skin has spaced apertures which start from the end 14, and bear the reference numerals 20, 22, 24, and 26. Although four apertures are shown in the structural member 12, it is to be understood that more or less apertures may be provided, depending on the particular joint design. It is to be further understood, that the joint contemplates the use of multiple rows of fasteners, as illustrated in FIG. 2, suggesting that the skin would contain spaced apertures located in rows along at least two dimensions of the structure. The apertures 20, 22, 24 and 26 extend through the structural member 12 and are adapted to receive fasteners in a manner to be explained in greater detail subsequently.

A tapered splice plate, designated generally by the reference numeral 30 has a surface 32 which abuts the second side 18 of the skin 12, and is designed to overlap the ends 14 and 15 of the structural members 12 and 13. FIG. 1 shows the splice plate broken in the area of the skin 13; however, it is to be understood that the portion thereof that overlaps the skin 13 is similar in design to that of the area that engages the skin 12. It is further apparent from FIG. 1, that an identical splice plate 31, shown in phantom in FIG. 1, may be positioned opposite the splice plate 30 and thereby sandwich the skins 12 and 13 to form a joint. Since the structural design of the splice plate 31 is similar to that of the plate 30, it is not considered necessary to describe the splice plate 31 in detail. In view of the above discussion, it should be apparent that the invention contemplates using a single splice plate 30 to consummate the joint. Although not shown, it is contemplated that the splice plate 30 could also be utilized as a means for patching a hole in the skin surface, by having the thick portion thereof extend over an opening and the tapered portion thereof fastened to the adjacent skin in the manner shown in FIG. 1.

The tapered splice plate 30 has an outside surface a portion 34 of which is the thickest portion of the tapered plate. This surface is parallel to the inside surface 32 and extends for a distance toward the thinner end of the plate such that the head of a fastener utilized to secure the plate to the skin structure has a flush contact with the surface 34. This area of the splice plate may be thickened or otherwise reinforced for purposes which will be explained more fully hereinafter. An aperture 42 which also constitutes a bearing area is formed through the spice plate in the surface area 34 and is adapted to be aligned with the aperture 20 in the skin.

The splice plate then tapers to another surface area 36 which is also parallel to the surface 32. Another bearing area 44 is formed through the spice plate at this position and is positioned to be perpendicular to the surface area 36 and the surface area 32, and to be aligned with the aperture 22 in the skin. Again, the length of the surface area 36 is sufficient to allow the entire head area of a fastener to have flush engagement with the surface 36.

The splice plate then tapers to the surface area 38 which is again parallel to the surface 32. The length of the surface area 38 is such that the entire head of a fastener can have flush and parallel engagement with the surface 38. A bearing area 46 in the form of an aperture is formed through the splice plate at this point and is also perpendicular to the surface 38 and the surface 32 and aligned with the aperture 24 in the skin.

The splice plate tapers again to the surface 40 which is also parallel to the surface 32. The surface 40 is of a length to allow flush engagement of the fastener with the surface 40. A bearing area 48, in the form of an aperture is also formed through the splice plate at this point and aligned with the aperture 26 in the skin. The bearing area 48 is centered on the surface 40 and is positioned perpendicular thereto.

The splice plate tapers from the end of the surface 40 to the end 58 of the splice plate which joins with the surface 32.

The above description of the splice plate 30 is that of what might be termed a stepped splice plate surface. The stepped tapering arrangement facilitates the clamping of the splice plate to the skin structure in that the parallel surfaces 34, 36, 38 and 40 allow the heads of the fasteners 50, 52, 54 and 56 to transmit the clamping force applied by the fasteners in the most appropriate manner. It is to be understood; however, that the splice plate may be a continuous taper from the thicker portion to the thinner portion, and tapered washers placed under the heads of the bolts to accomplish the same purpose. The fasteners 50, 52, 54 and 56 are bolts which extend through the apertures 42, 44, 46 and 48 of the splice plate and the apertures 20, 22, 24 and 26 of the skin, respectively. The bolts are threaded on their ends opposite the heads, and receive washers and nuts in the conventional manner for joining the splice plate to the skin structures. Although not shown, it is to be understood that if the splice plate 31 is also utilized in the joint, the apertures extend through the splice plate 31 and the fasteners are of the length to extend through the apertures, the nuts and washers engaging the outside surface of the splice plate 31. It is contemplated that the use of rivets and other forms of fasteners are within the scope of the invention.

It should be understood, that if multiple rows of fasteners are utilized, they would appear as shown in FIG. 2. It should also be apparent, that the splice plate shown in FIG. 1 tapers in the opposite direction in overlapping the skin member 13, and fasteners would be utilized to secure the other end of the splice plate to the skin.

OPERATION

From the above description of the structure of the invention it is believed that the operation thereof will now become apparent. In optimizing the tapered splice plate joint it is necessary to define the load deflection characteristics of the fastener, such as 50, including the local deformation of the members to be fastened. For the members, the elastic behavior of each member between adjacent stations must be defined. A station is located at each fastener and at each discontinuity in either member. A tapered splice plate is represented elastically as a series of steps with a precise match of properties at each fastener station. Strength cutoffs are also needed for the fasteners in shear and for the members under combined bearing and bypass loads at each fastener station. The total load in a member, at each station, is the sum of the bearing load at the particular fastener and the bypass load which is reacted at other fasteners. This information can be determined from an iterative computer program which provides a digital solution for the load sharing between the multiple parallel springs (i.e, the fasteners) and also accounts for the linear or nonlinear stretching of the members between the fasteners as sets of springs in series. Thus, both equilibrium forces and compatability of displacements are ensured. This information can also be obtained empirically through a series of tests conducted on test specimens.

When the above information has been ascertained, it is applied to the multi-row of bolted joint as shown in FIG. 1 in the following manner. For the most effective joint, the skin 12 and 13 is of a uniform constant thickness throughout the joint. This means that the skins remain of a constant thickness from one end of the splice plate to the other end. The splice plate tapers in thickness from the row of bolts 56 to bolt row 50 in order to favorably distribute the load transfer within the joint. Both bolts 54 and 52 increase in bearing area sequentially to maximize bearing area at bolt row 50.

Joint load is maximized by, (1) minimizing the load transfer into the splice plates by bolts 56, while simultaneously (2) maximizing the load transfer between skin 12 and splice plate 30 at the bolt row 50. The splice plate at bolt row 50 must have enough net section strength to accommodate the higher bypass load carried through this section. These principles apply to tapered splice plates with constant bolt diameters. It has been determined; however, that further optimization can occur by also adjusting the row 56 and the row 50 bolt diameters. For example, the last bolts 56 smaller and the first bolts 50 larger than the average diameter in the joint. At each hole, the bolt bearing/bypass load interaction curve is checked and the optimum joint configuration should produce the critical failure interaction in the skin net section at the bolts 56.

Figure 3:
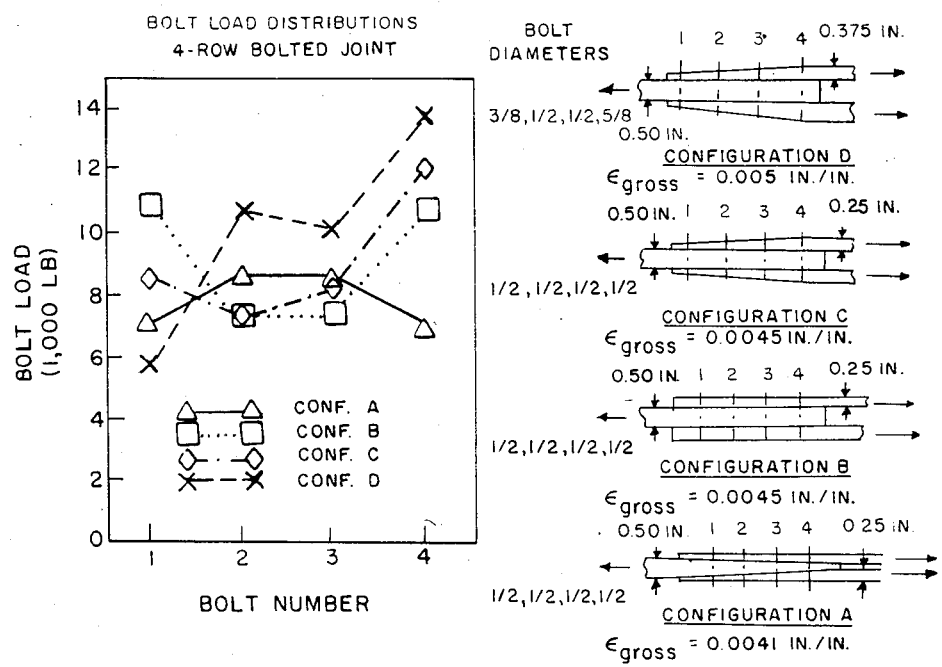
FIG. 3 is a graphical illustration of the effect of joint configuration on bolt load distribution.

FIG. 3 shows a graph which shows bolt load plotted against bolt number for various joint configuration. Configuration A shows a scarf type joint using one-half inch fasteners at four locations. Configuration B shows a joint using a skin of uniform thickness and splice plates of uniform thickness. Configuration C shows a joint using a uniform skin thickness and uniformly tapered splice plates. Both the B anc C configurations utilized four one-half inch fasteners.

Configuration D uses a skin of uniform thickness and reinforced tapered splice plates. The constant thickness area (surface 34 area in FIG. 1) may be thickened or otherwise reinforced at this joint to take the loads. In the D configuration, the fastener diameter was also varied to optimize the joint, a three-eighths diameter fastener being utilized in the thinnest area of the splice plates, half-inch diameter fastener being utilized intermediate the thinnest and thickest portion of the splice plates, and a five-eighths diameter fastener being utilized at the thickest portion of the plates.

It is apparent from the graph shown in FIG. 3, that the joint configuration D is clearly superior in minimizing load transfer at the last bolt row (bolts 56 as shown in FIG. 1) in accordance with the design criteria. Furthermore, a superior gross strain for the joint was obtained, namely 0.005 inch/inch.

Figure 4:
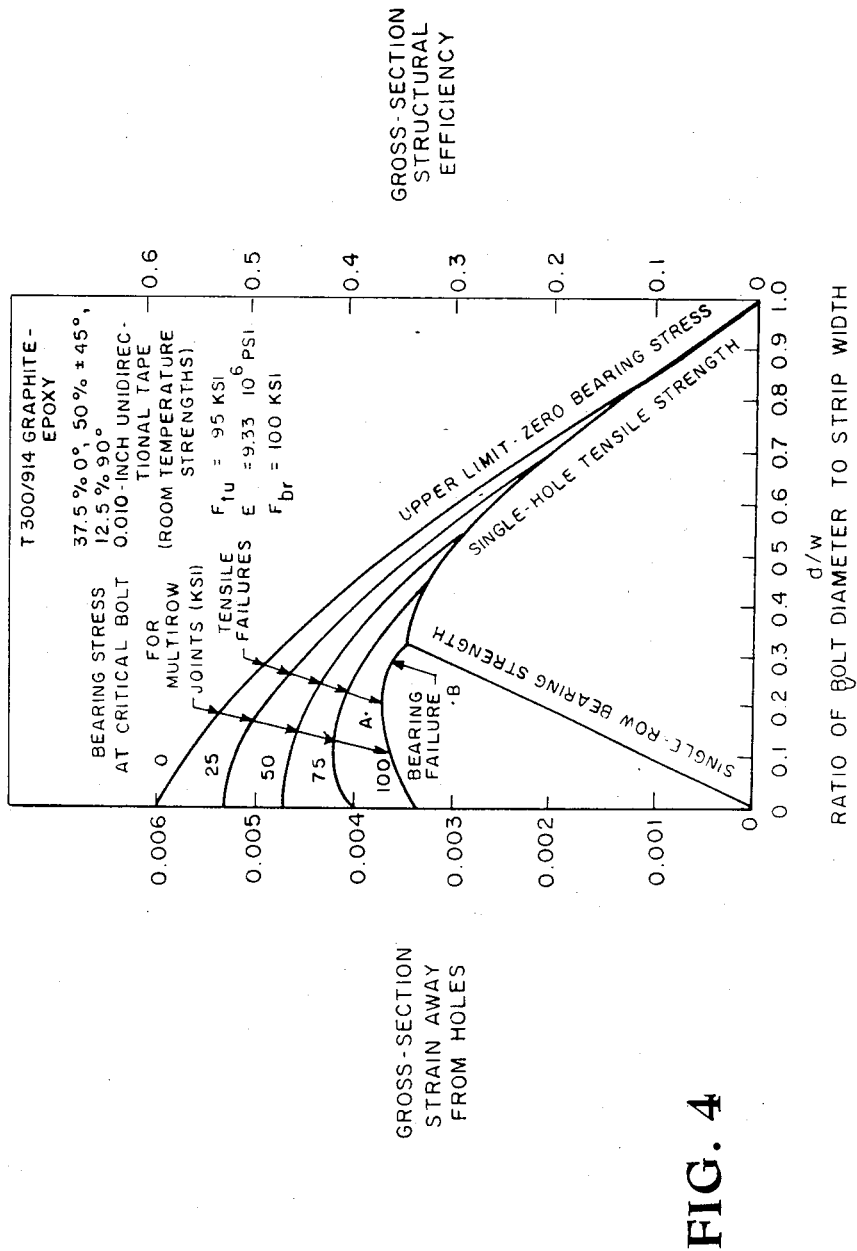
FIG. 4 is a graphical illustration of the ratio of bolt diameter to strip width.

The superiority of the reinforced tapered splice members in combination with the uniform skin can be explained. The greatest strength is obtained by maximizing the bypass load at the outermost row of fasteners 56. This involves decreasing the load transfer in order to maximize the bypass load, which represents the sum of all the other bolt loads. This design philosophy is reflected in FIG. 4 which shows that the only way a multi-row joint can be more efficient than the single row joint is by reducing the bearing stress in the skin at the outermost bolt location. Normally, the intermediate bolts will always be less critical in the skin than the end bolts. The sequence of iterations in optimizing the design is governed by maximizing the bypass load in the skin at the first row of bolts 56 while not causing a premature failure in either the skin or splice at the last row of fasteners 50. Since there is no bypass load in the skin 12 at the last row of fasteners 50, it is desirable to maximize the load transfer there to reduce the load at row 56. Only local reinforcement is needed in the splice plate to tolerate the combination of maximum bearing and bypass loads. A larger diameter fastener for the row 50 of bolts or a smaller diameter fastener for the row 56, where the splice plates are thinnest, will often be of assistance in this optimization process. Any small extra weight in the splices or fasteners is worth incurring to maximize the efficiency of the large heavy skins. The splice efficiencies cannot be evaluated only on the basis of minimizing the weight of the splices and fasteners.

Although the invention has been described relative to specific embodiments, it is not so limited and numerous variations thereof will be readily apparent to those skilled in the art. For example, the bolt diameters of the rows of fasteners may be varied to favorably distribute the bolt joint loads. Further, the spacing and gaps between the rows of fasteners may be varied to accomplish the purposes of the invention. Thicknesses of the splice plates may be varied to accommodate bearing or bypass loads.

What is claimed as new and desired to be secured by Letters Patent of the United States is:

1. A joint comprising:
   structural member means having at least one portion thereof to be joined to another portion each of substantially uniform thickness thereof throughout;
   splice means adapted to be connected to at least one of said portions;
   a plurality of fastener means for securing said splice means to at least a portion of said structural member;
   said splice means having bearing areas engaged by said fastening means which vary for minimizing the splice means bearing stresses coincident with maximum bypass load in the structural member means while simultaneously maximizing load transfer in both the structural member means and splice means at a position removed from said first mentioned position.

2. A joint as in claim 1 wherein said splice means is thicker in one area and being tapered to a thinner area.

3. A joint as in claim 2 where said bearing areas are smaller at the thinner area of said splice means and larger at the thicker area of the splice means and means for reinforcing the thicker area of said splice means.

4. A joint as in claim 1 wherein the bearing areas are varied by varying thickness of the splice means.

5. A joint as in claim 1 wherein the bearing areas are varied by varying the size of the fastening means.

6. A joint as in claim 1 wherein the bearing areas are varied by varying both thickness of the splice means and size of the fastening means.

7. A joint as in claim 2 wherein said fastener means are bolts.

8. A joint as in claim 2 wherein said fastener means are rivets.

9. A joint as in claim 2 wherein said fastener means are rows of bolts.

10. A joint as in claim 1 wherein said splice means includes a first splice member and a second splice member sandwiching said structural member means, said first and second splice member being joined to said structural member means by said fastener means.

11. A joint as in claim 10 wherein said first and second splice member sandwich both portions of said structural member means.

12. A joint as in claim 2 wherein the splice means thicker area is positioned adjacent the juncture of the positions of the structural member means.

13. A joint as in claim 2 wherein said splice means taper has stepped portions having surfaces being substantially parallel to the structural member means surface which the splice member means engages.

14. A joint as in claim 13 wherein said fastener means are bolts, said bolts having heads engaging the stepped portion surfaces of said splice means.

15. A joint comprising:

a first structural member;

a second structural member of substantially uniform thickness throughout positioned adjacent said first structural member;

tapered splice means overlapping said first and second structural members;

said tapered splice means having a thicker portion thereof located at the ends of said first and second structural members and a thinner portion located at a position removed therefrom;

apertures formed in said structural members and splice means being spaced and aligned to receive fastening means;

fastening means located in said structural members and splice means apertures and engaging them to form said joint; and said splice means having bearing areas engaged by said fastening means which are greater at the thicker area than at the thinner area of the tapered splice member for transferring loads from said thinner area to said thicker area.

16. A joint as in claim 15 wherein said fastening means are bolts.

17. A joint as in claim 16 wherein said apertures and bolts are arranged in rows and there are a plurality of rows.

18. A joint as in claim 15 wherein a first splice member is located of one side of said first and second structural members, and a second splice member is located on the opposite side of said first and second structural members, said fastening means engaging both of said splice members and sandwiching said uniform thickness structural members therebetween.

19. The method of making a joint comprising the steps of:

providing a first structural member of substantially uniform thickness throughout to be joined;

positioning a second structural member to be joined to said first structural member adjacent thereto;

overlapping said first and second structural members with a tapered splice member;

positioning said tapered splice member so that the thickest portion thereof is located at the juncture of said structural members and the thinnest portion remote therefrom;

forming bearing areas in said tapered splice member such that the greatest bearing areas are in the thickest portion of said tapered splice member; and joining said tapered splice member to said structural members with fasteners engaging said bearing areas in a manner to minimize load transfer between the structural members at a point where the bypass stresses are the highest while simultaneously maximizing bearing load in both the structural members and tapered splice member where the structural members bypass loads are minimum.

* * * * *